J. S. DU BOIS.
Apparatus for the Generation of Motive Power.
No. 240,978. Patented May 3, 1881.
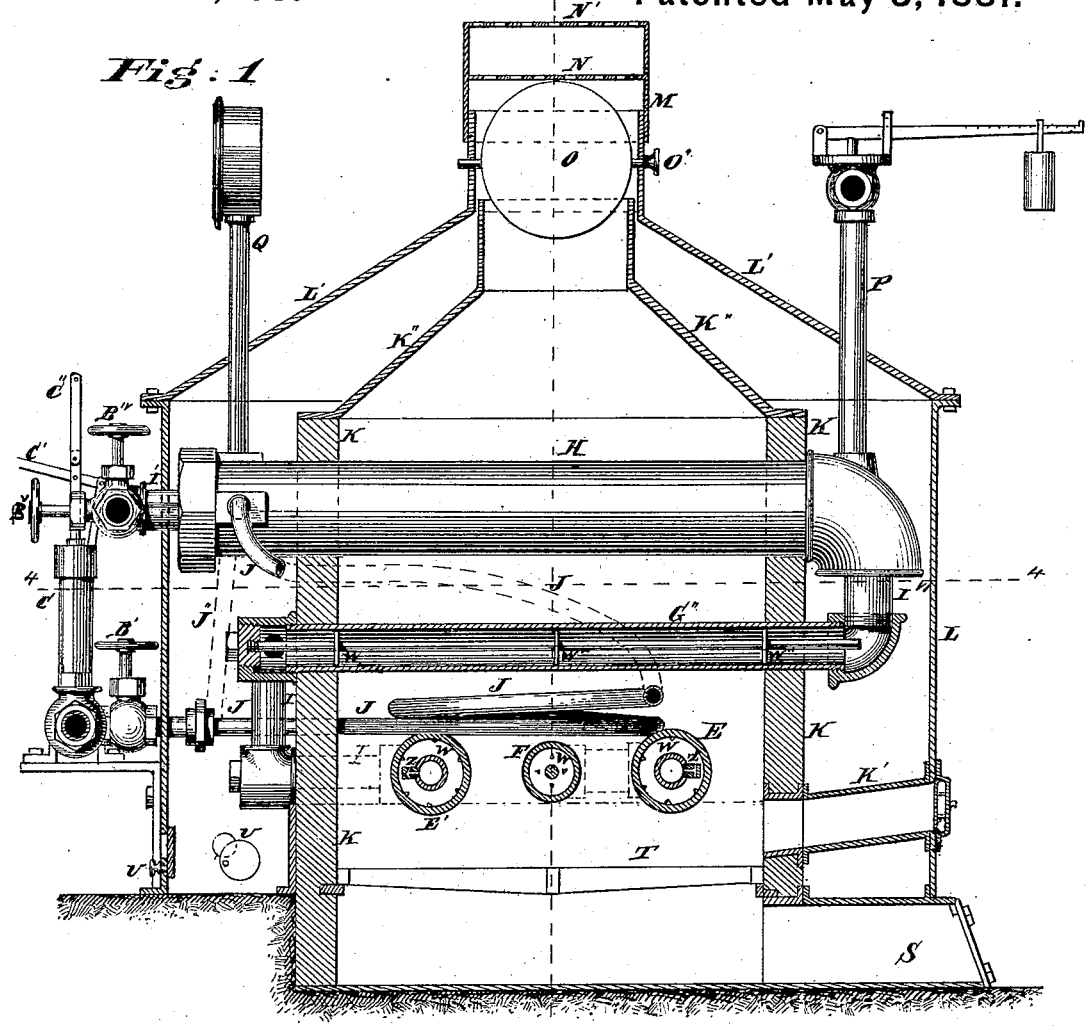
Fig. 1
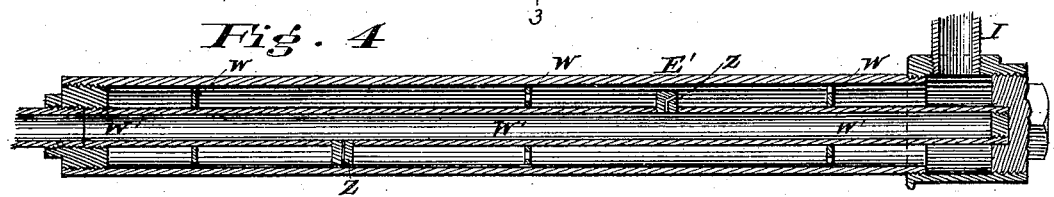
Fig. 4
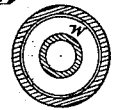
Fig. 5
Fig. 6
Fig. 7
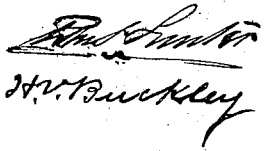
Attests
Fig. 8
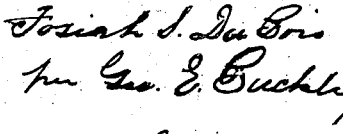
Inventor
Josiah S. Du Bois
per Geo. E. Buckley
Atty J. S. DU BOIS.
Apparatus for the Generation of Motive Power.
No. 240,978. Patented May 3, 1881.
5 Sheets—Sheet 2.
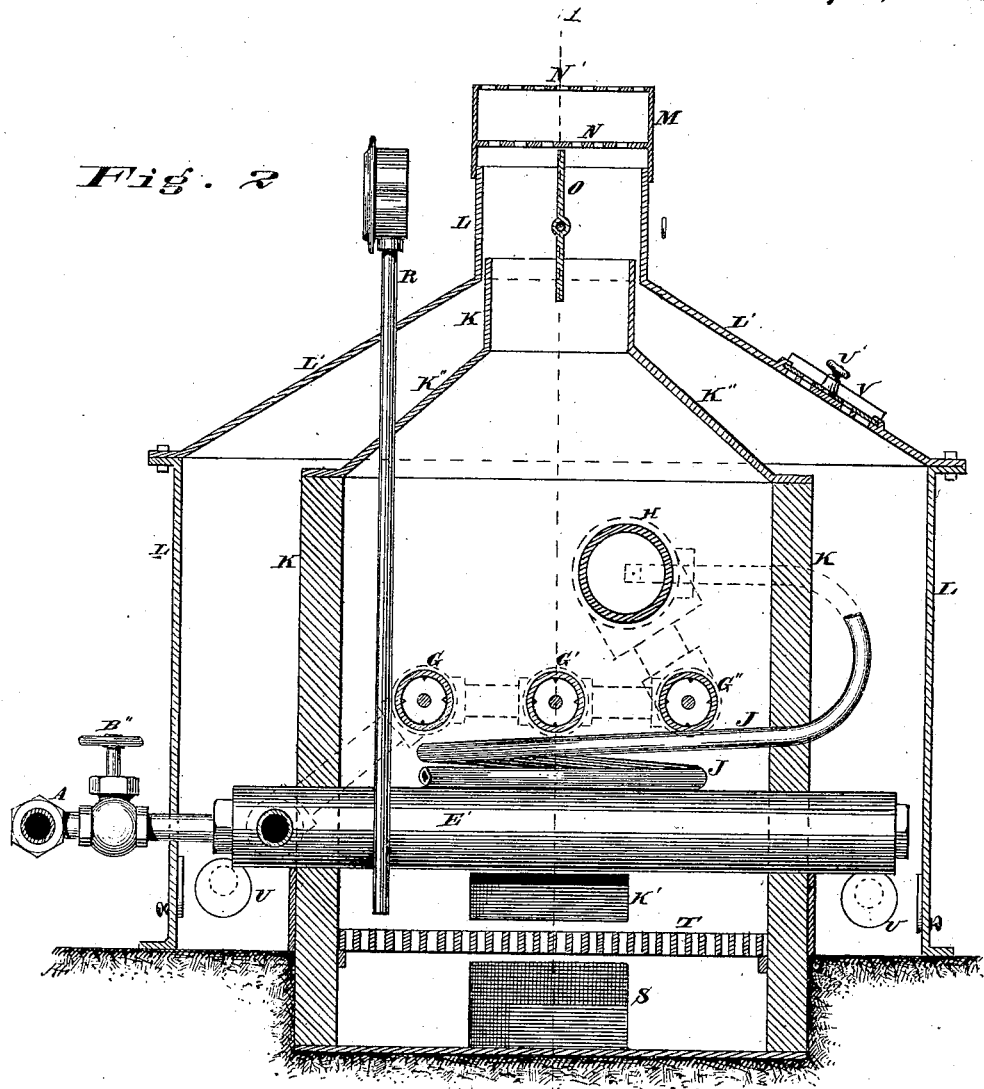
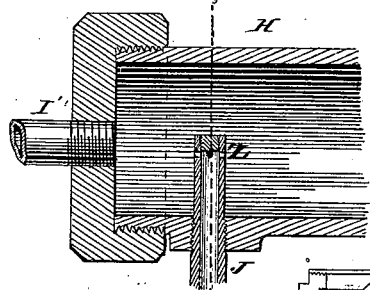
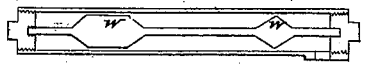

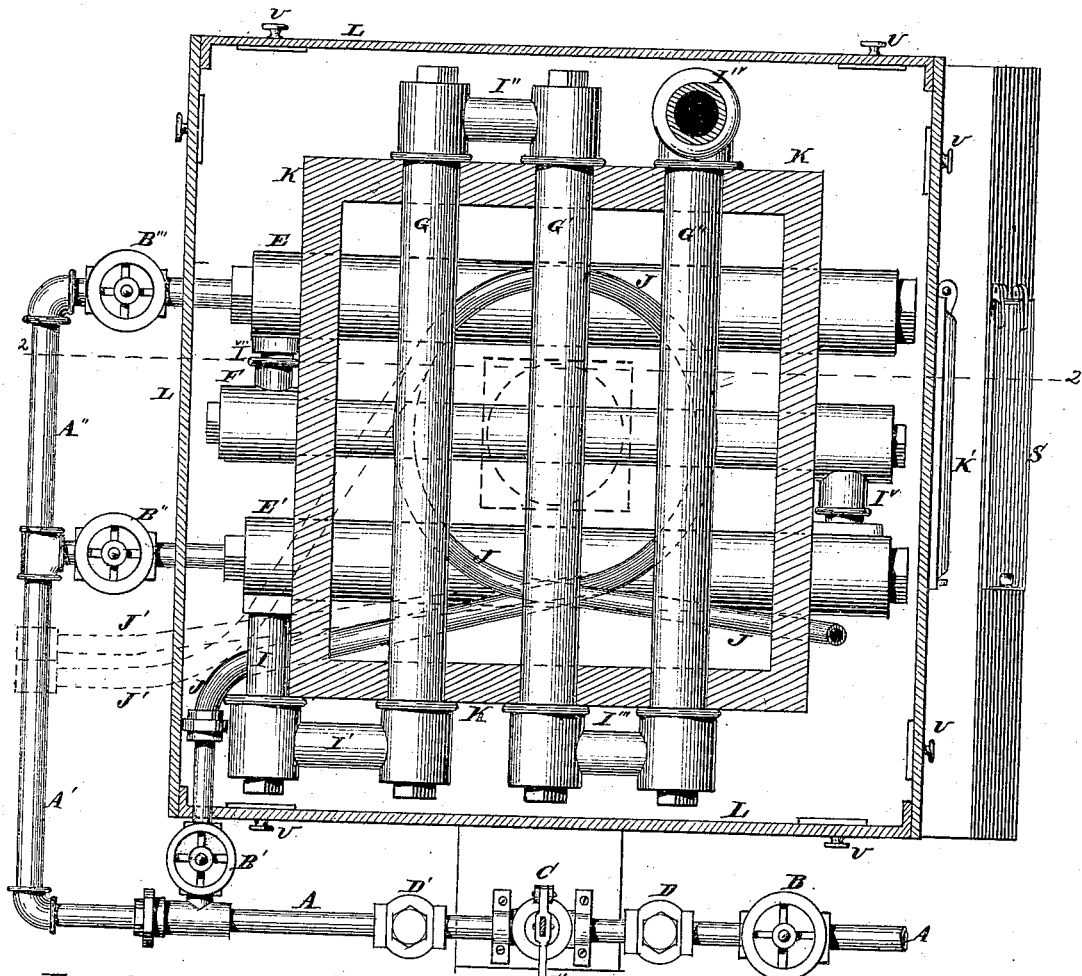

J. S. DU BOIS.
Apparatus for the Generation of Motive Power.

No. 240,978. Patented May 3, 1881.

Attests
Inventor
Josiah S. Du Bois
per Geo. E. Buckley
atty.

J. S. DU BOIS.
Apparatus for the Generation of Motive Power.
No. 240,978. Patented May 3, 1881.

Attests
Thos Smith
H. V. Buckley

Inventor
Josiah S. Du Bois
per Geo. E. Buckley
atty.

UNITED STATES PATENT OFFICE.

JOSIAH S. DU BOIS, OF CAMDEN, NEW JERSEY.

APPARATUS FOR THE GENERATION OF MOTIVE POWER.

SPECIFICATION forming part of Letters Patent No. 240,978, dated May 3, 1881.

Application filed January 20, 1880.

*To all whom it may concern:*

Be it known that I, JOSIAH S. DU BOIS, of Camden, Camden county, State of New Jersey, late of Penn's Grove, Salem county, New Jersey, have invented certain new and useful Improvements in Apparatus for the Generation of Motive Power; and I do hereby declare the following to be a full, clear, and exact description of the same, reference being had to the annexed drawings, making part hereof.

The nature of my invention will be fully set forth in the following description and claims.

In the drawings, Figure 1 is a vertical cross-section of my apparatus on the line 1 1 of Fig. 2; Fig. 2, a similar view on the line 2 2 of Fig. 3 and 3 3 of Fig. 1; Fig. 3, a horizontal sectional view on the line 4 4 of Fig. 1; Fig. 4, Sheet 1, a vertical longitudinal sectional view of one of the generators. Fig. 5 is a cross-sectional view of one of the superheaters, showing one of the strainer-disks, which are supported in place by an axial bar or hollow tube, the latter being set at its ends into the centers of the heads of the superheater, the strainer-disk being plain and of slightly smaller diameter than that of the superheater. Fig. 6 is a strainer of similar construction to that shown in Fig. 5, with the exception that the disks are of the same diameter as the inner space in the superheater or cylinder, and are notched at their edges so as to leave openings through them; Fig. 7, a strainer similar to that shown in Fig. 6, excepting that the openings are through the face of the disks instead of at their edges. Fig. 8 combines the features of the disks shown in Figs. 6 and 7 by having the disks notched at the edges and also pierced through their surfaces. Fig. 9, Sheet 2, is a detached longitudinal sectional view of one end of the receiver, showing the end of the coil for introducing and spraying the water, steam, or vapor, and the outlet-pipe for the exit of the vapor or steam from the receiver to the engine to be operated; Fig. 10, a vertical cross-section on the line 5 5 of Fig. 9. Fig. 11, Sheet 3, is a detached plan view of two nests of connecting-tubes for the generation of power. Figs. 12, 13, 14, and 15 are detached views of various kinds or forms of disintegrator for spraying water or steam in my apparatus; Fig. 16, Sheet 2, a similar view, showing two forms of strainers—viz., an outer cylinder and an inner centering long rod, which supports near one extremity a cylindrical block in the inside of said cylinder, which block nearly fills a short interval of the interior space of said cylinder, and has conical ends, which each taper down to the rod, and near the other extremity this rod supports another block in the form of a double cone, both of its ends tapering down to the rod, each block resembling a torpedo in form; Fig. 17, a longitudinal sectional view of one form of strainer, composed of an outer cylinder or shell and an inner cylinder of slightly smaller diameter, the water to be vaporized passing along in a thin sheet in the annular space between the outer shell of the inner cylinder and the shell of the outer cylinder. Fig. 17, Sheet 4, is a vertical sectional view of a furnace, showing the inner contained generator, superheater, and receiver; Fig. 18, a vertical sectional view of my adjustable disintegrator, which is inserted in the course of the water-delivery to the generator, and is set upon the water-pipe within the generator. Fig. 19, Sheet 5, shows a view of one form of superheater; Fig. 20, a cross-section of the same on the line 6 6, Sheet 5 at the points where the steam is divided. Figs. 21 to 28 are similar views and cross-sections of superheaters of divers forms.

To enable others skilled in the art to make and use my invention, I will describe its construction and operation.

A A' A², Sheet 3, is the water-supply pipe. B B' B'' B''' B$^{IV}$ B$^{V}$, Figs. 1 and 3, are valves to regulate the course and supply of water.

C, Sheets 1 and 3, is a pump; C', a pump-handle; C'', Sheet 1, the lever on the end of the plunger of the pump, which is driven by the steam-engine.

D D', Sheet 3, are check-valves; E E', Sheet 3, generating-cylinders; F, Sheets 1 and 3, a superheater in the same plane as the cylinder E E'.

G G' G'', Sheet 2, are superheaters placed above and at right angles to cylinders E E'.

H, Sheets 1 and 2, is the receiver.

I I' I'' I''' I$^{IV}$ I$^{V}$ I$^{VI}$, Sheet 3, are short connecting tubes or pipes to connect the various cylinders, superheaters, and the receiver one with another.

J is a coil; J', Sheet 3, a supplemental coil; J'', Sheet 1, a short tube or pipe to connect the receiver and the water-supply pipe of coil J.

K K are the walls of the furnace, made of brick or fire-brick; K', the coal-hole chute; K'', the roof of the furnace.

L is the outer wall or shell around the furnace K, leaving between it and said furnace a space or air-chamber, which contains the joints and ends of the various generators and superheater-cylinders; L', Sheets 1 and 2, the roof of the outer shell, which is so much higher than that of the furnace as to continue the air-chamber above the furnace as well as around it. The flue of the furnace is round, and leads into the flue M of the air-chamber, the bottom of which latter—i. e., where the round flue of the furnace enters it—is square, while when it gets as high as the damper O it is also round, the object of this construction being to allow a draft of air to pass up the flue at its lower square corners around the outside of the round furnace-flue, Figs. 1 and 2. The flue M thus serves the double purpose of creating a draft through the air-chamber as well as through the furnace.

O is the damper; O', the handle thereof; N N', spark-arresters, which are perforated in such a manner that the holes in the disk N' break or interrupt current with those of disk N—that is, a spark coming up through a hole in the disk N will strike the surface of disk N' between two holes of the latter, thus freeing the ascending air and gases of flying sparks and cinders.

P, Fig. 1, is an ordinary weighted safety-valve, to regulate the pressure in the receiver H, and thus control the pressure in all the generating and superheating cylinders which have a continuous free passage to the receiver.

Q, Fig. 1, is a pressure-gage, also attached to the receiver H.

R, Fig. 2, is a pyrometer to indicate the heat in furnace K.

S is the ash-hole; T, grate-bars; U, small ventilators or draft-regulators, to regulate the circulation and draft of the atmospheric air through the air-chamber and pivoted disks over holes in the shell L and roof L', operated by the turning-knobs from the outside, these knobs being attached to the pivot-shafts of the disks.

V, Sheet 2, Fig. 1, is a large slide ventilating-door, which is operated by the knob of one of the small regulators U, which is placed in it.

W W, Sheet 1, are strainer-disks on the water-pipe W' in the generating-cylinders E E', each disk being either perforated or notched in its edges or constructed as already remarked of Figs. 5 to 8, inclusive.

X X of Fig. 11 are generating-cylinders.

Y Y, Fig. 11, are superheating-cylinders.

Z Z are disintegrators for spraying the water or steam in the generators as it is projected from water-pipes W', Fig. 4.

W'', Fig. 1, are pipes or rods to hold the strainers.

In all the drawings similar letters indicate like parts, though they may be disposed in various positions.

Fig. 18, Sheet 4, shows a disintegrator composed of a base, Z', and upwardly-converging strips or slats Z''. These strips form, by union with the block Z''', a standard to sustain the water-conductor pipe $Z^{IV}$. This pipe has a flanged mouth, as shown, and is screw-threaded, so as to correspond with a female thread through block Z'''. The water coming through the pipe $Z^{IV}$ is sprayed and distributed into particles by coming into sudden contact with the convexity of the bottom Z', and the amount of spraying is regulated by raising or lowering the pipe $Z^{IV}$ in the block Z'''. This disintegrator is thus adjustable upward and downward, not so much for the purpose of regulating the quantity of fluid which shall pass through it as to determine the amount of spraying to be attained. The spraying is decreased by raising the pipe $Z^{IV}$ and increased by lowering it, and the surface or disk Z' is not a heating-surface, but merely serves as a disintegrator, to spray the fluid into a heated space or upon a heated surface. The whole apparatus (the disintegrator shown by Fig. 19) is intended to be set within a generating or superheating cylinder.

W''', Fig. 17, is a cylindrical block with conical or tapering ends in the superheater, to strain or film the steam which enters the latter. It is sustained in place by two rods or continuations from its ends, set respectively into the heads of the cylinder, as shown.

$W^{IV}$ $W^{IV}$, Figs. 19 and 20, are two blocks set in the superheater-cylinder, with numerous passages or grooves cut out of them next to the inner surface of the cylinder, as shown.

Figure 18:
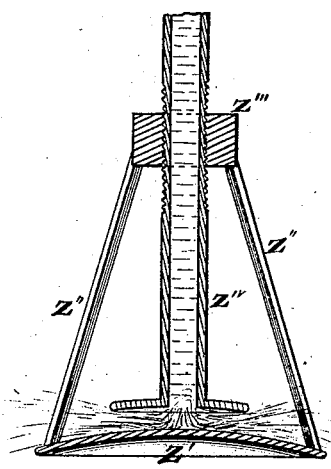
Figure 19:
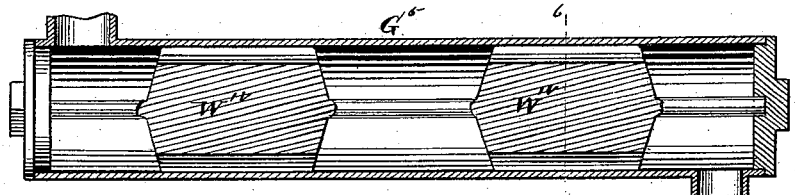
Figure 20:
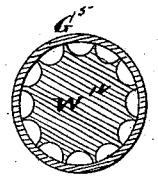
Figure 21:
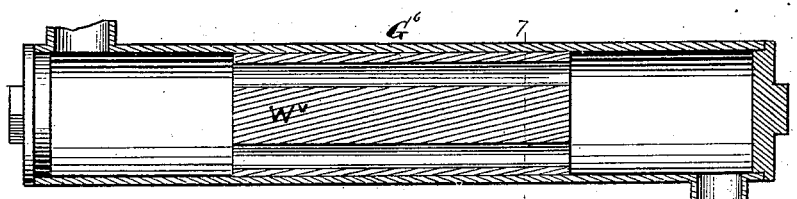
Figs. 21 and 22 show at $W^V$ a block for a like purpose, with passages drilled through the body of the block; $W^{VI}$, a number of blocks like that shown at W''', of smaller diameter than the inside of the superheater, and whose conical ends are joined end to end, as shown.
Figure 22:
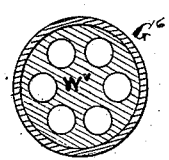

I am aware that devices similar to this have been used in the arts heretofore for separating a flame while it is passing through a tube which is surrounded by a volume of water; but this does not result in a filming of the steam to superheat it rapidly while it is in a small or thin volume, which is the object and result of my device, and to accomplish which I connect the interior of the cylinder containing the filmer W''', Fig. 18 (also shown in other forms in the subsequent figures) with the steam or water supply pipe.

The object of the various forms of superheaters is to so manipulate the steam that in its passage through them it is exposed, first in a large then in small chambers, to the great heat of the furnace. This facilitates its superheating.

All the cylinders, whether generators, superheaters, or receivers, are, as shown at Fig. 9, supplied with removable ends or heads, which can be easily removed to permit the cylinders to be cleaned, these ends being outside the walls of the furnace. My superheaters can be used with any form of steam-boiler.

The operation is as follows: A good fire is first built in furnace K. The water which I use in my apparatus is to be pumped in by the engine when the latter is started by means of the pump C. At the upward stroke of the pump-piston the check-valve D opens to admit water from pipe A and the valve D' closes. At the downward stroke of the pump-piston the valve D' opens and valve D closes. This is to throw the water into the apparatus. Valves B' B'' B''' having been opened, some of this water passes through coil J to the receiver H, with which this coil connects, Figs. 1, 2, and 3, and is heated in its passage thereto as this coil passes into the furnace at a point shortly beyond where it receives the water, Fig. 3. The water thus thrown into the receiver H is disintegrated or sprayed into the receiver in a fine spray by means of the disintegrator Z, Fig. 10. The rest of the water in pipe A—that part not taken into coil J—passes around to A' A'' of pipe A, and through B'' B''' and into generating-cylinders E' and E, respectively. In entering these cylinders it passes into their axial water-pipes W', Fig. 4, thence through the disintegrator Z, by which it is thrown in a fine spray into the interior of the cylinder. The cylinder being very hot, this spray is converted into steam immediately; or, if any water should remain, it is forced through the openings of the strainer-disks W, and so broken up into fine particles as to become immediately converted into steam. The generating-cylinders are each furnished with these water-pipes, disintegrators, and strainer-disks. After the water is thus thoroughly converted into steam in the generators it passes from them, by means of pipes I$^V$ I$^{VII}$, Fig. 3, into superheating-cylinder F at opposite ends of the latter. This cylinder contains a rod, W'', and the strainer-disks, as shown at G'', Fig. 1, which break the steam up into small particles, and it becomes superheated. The steam then passes to an upper tier of superheaters, G G' G'', by the connecting-pipe I I from the generator E'. In practice I shall pass the superheated steam direct from cylinder F to this upper tier. After entering the upper tier of superheaters by cylinder G, it passes through the whole length of G, through pipe I'', through superheater G', pipe I''', superheater G'', and by means of pipe I$^{IV}$ to receiver H above. All of these superheaters G G' G'' contain strainer-disks W, and these superheaters, as well as receiver H, are all located in the furnace K and subjected to its heat, and the steam, by the time it reaches receiver H, is in a highly-superheated state. It now passes out through pipe I' to the engine-cylinder to operate the engine, its flow being regulated or arrested by the valve B$^V$, Fig. 1. Now, as the highly-superheated steam is in a very dry state in the receiver H, and may therefore cause trouble in the working parts of the engine-cylinders and the valves, I lubricate the superheated steam by the introduction from coil J of a spray of hot water or steam at a low temperature, as shown at Z, Fig. 10; or an oil-pump may be used to inject oil or other lubricant. The necessity for this will always be indicated by the pressure-gage Q. When the steam in the receiver is at a low pressure the steam therein is not so dry and may not need lubrication. In such a case I either partially or wholly cut off the supply from coil J by closing, or partially closing, valve B', or I lubricate the steam after it enters the steam chest or cylinder of the steam-engine.

If I desire to feed heated water to the generators E E', I use coil J'. (Shown in dotted lines, Fig. 3.) In the drawings the two points of juncture of this coil with the pipe A' are shown very close together; but in practice I shall separate them far enough to enable me to use a valve on pipe A', between these points of juncture, by the closing of which the water will be forced to traverse coil J', which passes into and through the furnace and back to pipe A'. This course will project heated water or steam into generators E and E', and will, of course, result in more speedy generation, as it comes to the generator already partially heated, thus requiring less heat and consequently less fuel. If, on the contrary, it is desired to run cold water to the generators, by opening this valve on the pipe A between the points of juncture therewith of the ends of coil J', and by closing two cocks at the points of entrance and exit of coil J', the cold water will take a direct course to the generators. If it is desired to send the water only into cylinder E', and thus turn cylinder E' into a superheater, the valve B'' is closed and B''' left open. The water will then all pass into generator E, be converted to steam therein, and pass thence into and through cylinders F, E', and G, &c., successively.

If it is desired to inject cold water directly into receiver H, a valve which I shall use on coil J, immediately behind the juncture of pipe J'' therewith, will be closed, and cold water will thus flow through pipe J'' to the receiver. A valve which I shall use on this pipe J'' will at any time regulate or arrest the flow of water through it.

It will be noticed that all the joints and connecting-pipes of the cylinders E E' F G G' G'' are outside of the walls K of the furnace, and are in the cool-air chamber around it. This method of construction prevents the joints from being injured by the heat of the furnace, while all the other parts of these cylinders are subjected to it. These outwardly-projecting ends may be covered with felt or other non-conducting substance, if desired, to retain the heat of the steam passing through. This air-chamber can be kept warm or cool by regulating the vent-holes U U U and the draft-door V.

In the arrangement of generators and superheaters shown in Fig. 11, the water enters the generators X X X X by the water-pipes shown to the left, and the steam so generated passes through superheaters Y Y Y, and finally the steam from both sides of superheater Y' meets in superheater Y' and passes up through pipe I$^{VI}$ to the upper series of superheaters. In all cases I so construct my furnace as to leave the joints of the generators and superheaters outside of its walls.

B$^{IV}$ is a valve, which I shall make self-regulating, to regulate and reduce the pressure of steam coming through valve B$^V$ on its way to the engine.

The pressure in the apparatus can be lowered or increased by injecting more or less water through the valves B'' B'''. The more water sent in the less will be the resultant pressure.

The water or steam, entering the cylinder shown at Fig. 16 at either end, is separated in its body as it is forced through the cylinder by coming against the cones of the strainers W' W. The strainer W' there shown will carry the water or steam in a thin sheet around its sides before it reaches the other cone of the strainer, thus subjecting its particles rapidly to the action of the heat.

The roof K'' of the furnace I shall either cover with non-conducting material or I may build it entirely of such material.

The plugs forming the heads of the generators and superheaters are screwed into place and support the water-pipes and rods in the generators and superheaters, respectively, which support the strainers.

It will easily be perceived that my generators and superheaters can respectively be used for either of those purposes interchangeably.

I start my apparatus by means of the handle C' of the pump C. I first pump by hand water into the apparatus until there has entered enough to generate sufficient steam to start the engine, which then, operating the pump by the plunger C'', automatically supplies the apparatus with water.

Figure 17:
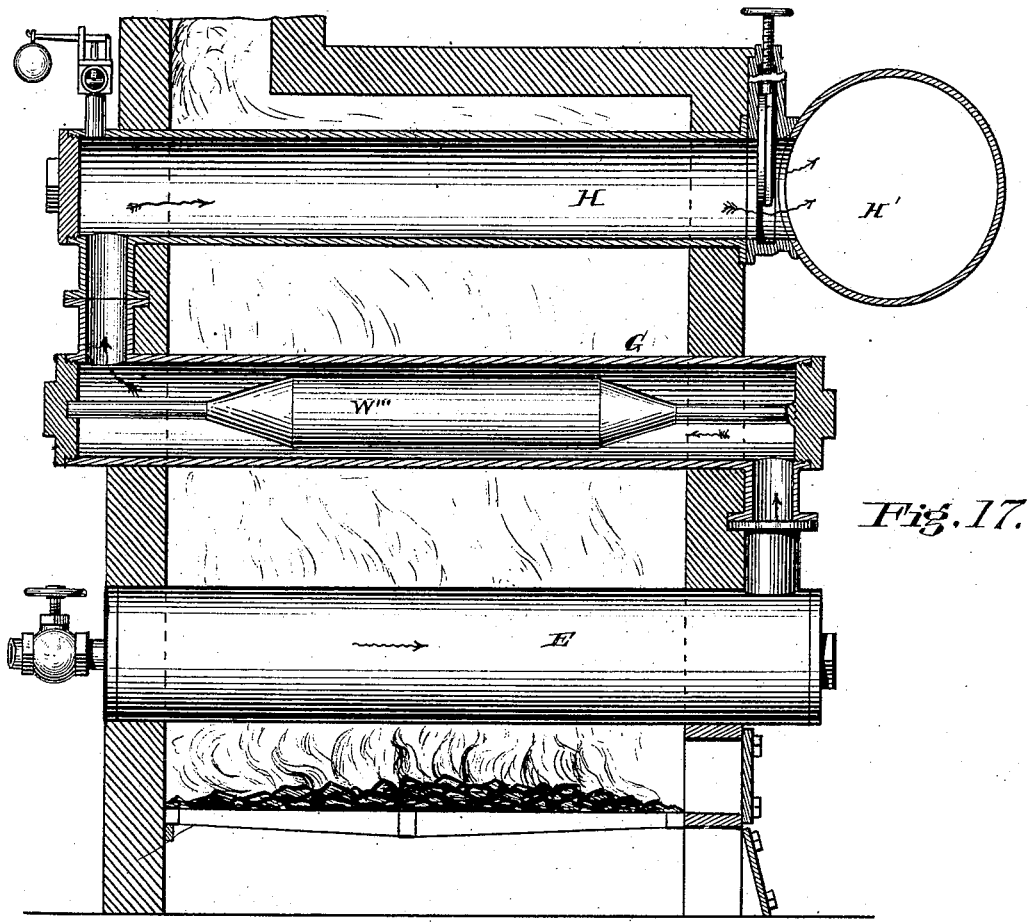
Figure 23:
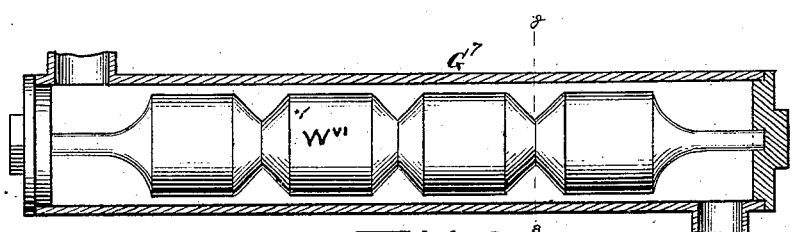
Figure 24:
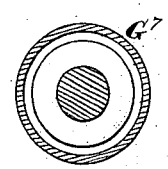
Figure 25:
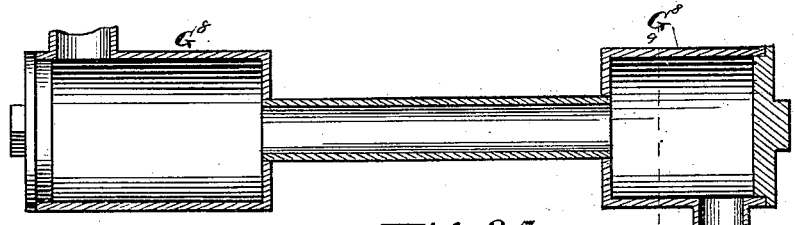
Figs. 25 and 26 are longitudinal and cross-sectional views of a superheater formed of two short cylinders joined by a long tube or pipe.
Figure 26:
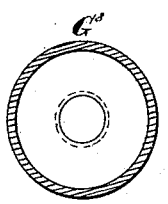
Figure 27:
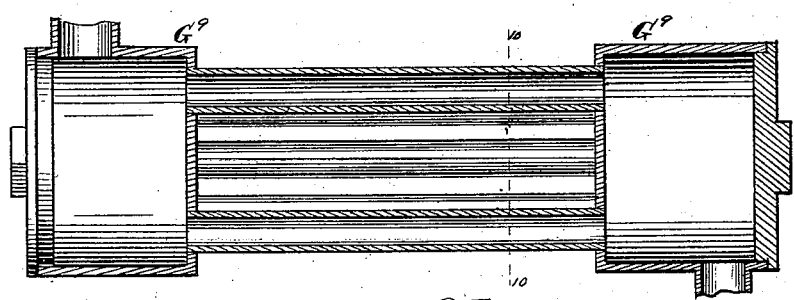
Figs. 27 and 28 show a similar superheater, excepting that a number of tubes or pipes are used to convey the steam from one cylinder to another, instead of one, as shown in Fig. 25.
Figure 28:
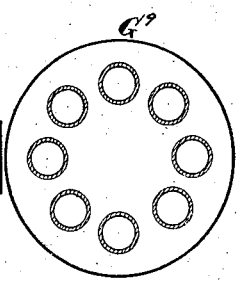

Figs. 19 to 28 are modifications of my combined superheaters and strainers. Fig. 23 shows a number of conically-ended cylinders set within the superheating or generating cylinder, the number shown being composed of mere duplications of the form set forth in Fig. 17, there being a water or steam supply pipe and correspondingly an exit-pipe.

Having thus described my invention, what I claim as new, and desire to secure by Letters Patent, is—

1. The combination of a furnace, a steam-generator composed of one or more cylinders, a superheating cylinder or cylinders, and a steam-receiving cylinder, the said superheating-cylinder being located and connected so as to conduct the steam from the generator to the receiver and subdivided within into large compartments, which are joined to each other by series of small compartments or passages, the steam being divided by the latter into several streams as it passes through, to rapidly superheat the steam, substantially as described.

2. The combination of lubricating-pipe J'', Fig. 1, pipe J, water-pipe A A' A'', and receiver H, arranged substantially as and for the purposes described.

3. In combination with a steam-generating cylinder and a water-supply pipe, the disintegrator, as shown by Fig. 18, adjustable upward and downward, substantially as and for the purposes described.

4. The combination of generators E E', furnace K, coil J, and water-pipe A, to supply either hot or cold water or steam to the generators E E', substantially as described.

5. In combination with a steam generating or superheating cylinder, an inner contained closed cylinder of smaller diameter and a water or steam supply pipe communicating or opening into the interior of said superheating-cylinder, as shown at G, Fig. 17, whereby the fluid introduced into said superheating or generating cylinder can be rapidly heated while in a film or small volume as it passes through, substantially as described.

6. In combination with a steam-generating cylinder and a water-supply pipe opening into it, the conically-faced strainer (shown at W$^{VI}$, Fig. 23) contained within the generating-cylinder, whereby the body or volume of the water or steam introduced is rapidly directed into a film around the strainer and quickly heated against the inner surface of the generating-cylinder, substantially as described.

7. In a steam-generating apparatus, the combination of cylinders E E', furnace K K'', outer shell, L L', the latter to form an air-space around the furnace, and ventilators U U', substantially as described.

In witness that the above is my invention I have hereunto set my hand.

JOSIAH S. DU BOIS.

Witnesses:
GEORGE E. BUCKLEY,
THOMAS LYNN.